United States Patent Office 3,190,873
Patented June 22, 1965

3,190,873
OXIDATION OF HYDRAZOAMIDES TO AZOAMIDES
Neil William Woodrow Porter, Loughborough, England, assignor to Whiffen & Sons Limited, Willows Works, Loughborough, Leicestershire, England, a company of Great Britain
No Drawing. Filed Oct. 20, 1961, Ser. No. 146,427
Claims priority, application Great Britain, Oct. 25, 1960, 36,513/60; Nov. 29, 1960, 40,884/60
11 Claims. (Cl. 260—192)

The present invention concerns an improved method for the oxidation of hydrazoamides.

It is known that hydroazoamides may be oxidised to azoamides with alkali metal dichromates; this method however is attended by disadvantages including the production of chromium-containing effluents, which may be difficulty disposable.

Chlorine is a common oxidising agent in industry, but has not been found suitable for the oxidation of hydrazoamides. The reasons for this are not clear, but inter alia chlorine decomposes the azoamide product.

It has now been found surprisingly that hydrazoamides may be readily oxidised in high yields to the corresponding azoamides by oxidation with chlorine in a non-alkaline medium and in the presence of catalytic amounts of bromine or a bromide. This discovery is unexpected in that in the oxidation in accordance with the invention decomposition of the azoamide product may be avoided, and furthermore, that other common chlorine activators do not enhance or catalyse the oxidation of hydrazoamides with chlorine.

According the present invention is for the oxidation of hydrazoamides of the formula:

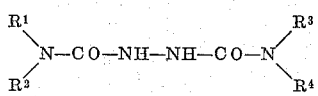

where $R^1$, $R^2$, $R^3$ and $R^4$ are selected from the group comprising hydrogen, alkyl, cycloalkyl, aryl and aralkyl groups, substituted or unsubstituted, to the corresponding azoamide, by treatment with chlorine in a non-alkaline medium, for example a medium having a pH in the range $-2$ to $+7$, in the presence of bromine or a bromide. In the formula above $R^1$, $R^2$, $R^3$ and $R^4$ may each be the same or different. Where $R^1$, $R^2$, $R^3$ and $R^4$ are alkyl, cycloalkyl, aryl or aralkyl groups, these may be substituted or unsubstituted. Where substituted, the substituent groups may comprise for example chloro or nitro groups. However it is preferred that these groups should be unsubstituted.

According to one embodiment of the invention, in the formula above $R^1$ is either hydrogen, alkyl (for example alkyl with from 1–12 carbon atoms, such as n-propyl, iso-butyl, octyl and dodecyl, but preferably methyl and ethyl), cycloalkyl (such as cyclopentyl and cyclohexyl), aryl (such as ethylphenyl and naphthyl, but preferably phenyl) or aralkyl having from 1–5 carbon atoms in the alkyl group (for example naphthyl ethyl, but preferably benzyl); $R^2$ is either hydrogen, alkyl (for example alkyl with from 1–12 carbon atoms, such as n-propyl, iso-butyl, octyl and dodecyl, but preferably methyl and ethyl), cycloalkyl (such as cyclopentyl and cyclohexyl), and (such as ethylphenyl and naphthyl, but preferably phenyl) or aralkyl having from 1–5 carbon atoms in the alkyl group (for example naphthyl ethyl, but preferably benzyl); $R^3$ is either hydrogen, alkyl (for example alkyl with from 1–12 carbon atoms, such as n-propyl, iso-butyl, octyl and dodecyl, but preferably methyl and ethyl), cycloalkyl (such as cyclopentyl and cyclohexyl), aryl (such as ethylphenyl and naphthyl, but preferably phenyl) or aralkyl having from 1–5 carbon atoms in the alkyl group (for example naphthyl ethyl, but preferably benzyl), $R^4$ is either hydrogen, alkyl (for example alkyl with from 1–12 carbon atoms, such as n-propyl, iso-butyl, octyl and dodecyl, but preferably methyl and ethyl), cycloalkyl (such as cyclopentyl and cyclohexyl), aryl (such as ethylphenyl and naphthyl, but preferably phenyl) or aralkyl having from 1–5 carbon atoms in the alkyl group (for example naphthyl ethyl, but preferably benzyl).

According to a preferred embodiment of the invention $R^1$, $R^2$, $R^3$ and $R^4$ are each hydrogen.

Examples of hydrazoamide starting materials in accordance with the invention include:

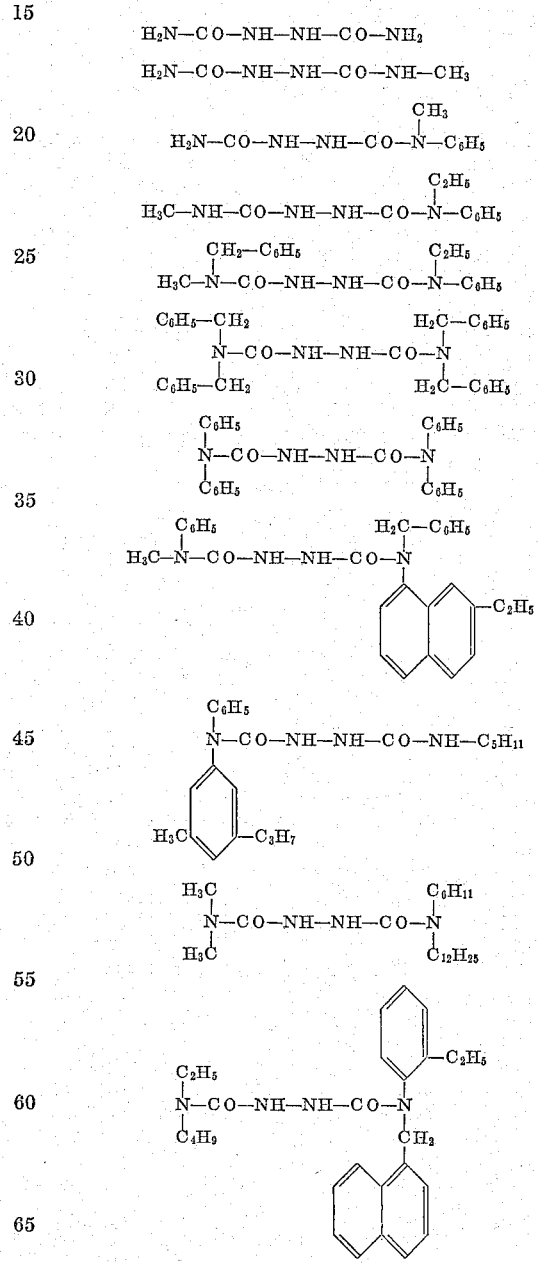

The chlorine employed may be in the liquid, gaseous or dissolved state. It has been found most convenient to bubble chlorine gas through the reaction medium. If desired, chlorine yielding materials, such as hypochlorite or a mixture of hydrogen chloride and hydrogen peroxide, may be used. However it is preferred to use chlorine per se. The amount of chlorine which reacts must not be in excess of the stoichiometric amount, as the introduction of further amounts of chlorine leads to the decomposition of the azoamide in accordance with the following equation:

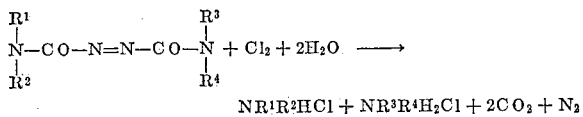

$$NR^1R^2HCl + NR^3R^4H_2Cl + 2CO_2 + N_2$$

It will thus be seen that this decomposition of the product leads to the production of a large volume of gas, and this affords a ready method for the determination of the end point of the reaction.

The temperature at which the oxidative chlorination is carried out is not very critical as long as side reactions which become noticeable at elevated temperatures, such as hydrolysis of the carbamoyl group, are minimised. The oxidation is suitably carried out at a temperature between $-10°$ C. and $45°$ C. and preferably between $0°$ C. and $30°$ C.

The oxidation with chlorine may be carried out as a batch or continuous process. Whichever method is employed it is necessary to ensure that the chlorine fixed in the system does not exceed the stoichiometric amount. The amount of chlorine introduced into the reaction may well be in substantial excess of the stoichiometric amount, where part of the chlorine passes unreacted out of the reaction medium.

The rate of oxidation is related to the efficiency of gas-liquid contact, and in order to obtain a high rate of reaction, the reaction medium requires to be efficiently agitated.

The oxidation may be carried out in an aqueous, aqueous-organic solvent or anhydrous medium. The reaction is preferably carried out in the presence of water and most conveniently, in most cases, the medium is water. Where an aqueous-organic solvent or organic solvent medium is used the organic solvent may comprise for example dioxan, ethylene glycol, dimethylsulphoxide, sulpholane and the like. The medium requires to be non-alkaline, for example of a pH in the range $-2$ to $+7$, and is preferably acid and for example of a pH in the range $-1$ to $+2$. The medium may be rendered acidic by the addition of an acid to the medium; such acid may be any strong acid and preferably a non-oxidising acid but is most conveniently hydrochloric acid. Other suitable acids which may be used include hydrobromic acid, sulphuric acid, phosphoric acid, trichloroacetic acid and the like. The oxidation may be carried out under atmospheric pressure, reduced pressure or elevated pressure. Although it is usually more convenient to operate at atmospheric pressure, the rate of reaction is increased by operating at pressures in excess of atmospheric. Elevated pressures at which the process may be operated lie in the range atmospheric pressure to about 120 pounds per square inch pressure gauge and are suitably of the order of 5–40 for example 20 pounds per square inch pressure gauge.

The bromine or bromide may be present in amounts varying over a wide range, but essentially only requires to be present in catalytic amounts. The amount of bromine or bromide suitably comprises about 1–20% by weight based on the hydrazoamide starting material, and preferably comprises about 2–10% based on the hydrazoamide starting material. Bromides which may be mentioned include alkali metal bromides, such as for example sodium bromide and potassium bromide, alkaline earth metal bromides, such as for example calcium bromide and barium bromide; other metal bromides such as for example ferric bromide, chromic bromide, copper bromide, strontium bromide, cobaltic bromide and zinc bromide; hydrobromic acid; and halogenobromides such as bromine monochloride. Similarly the bromide may be an organic bromide such as a quaternary ammonium bromide such as tetramethylammonium bromide or tetraethylammonium bromide. The rate of reaction is related to the concentration of bromide or bromine in the total reaction liquor. This concentration of bromide or bromine in the total reaction liquor is suitably in excess of about 0.1% weight/volume, for example 0.1–5% weight/volume and is suitable about 1% weight/volume. The weight/volume ratio is calculated as grams/cubic centimetre.

The folowing examples are given to illustrate the present invention. The parts and percentages are by weight.

*Example 1*

100 parts of hydrazoformamide were suspended in 700 parts of concentrated hydrochloric acid (36%) and 300 parts of water in which were dissolved 12 parts of ferric bromide. The pH of the medium was below 0. 74 parts of chlorine were passed into the suspension which was cooled to $10°$ C. On filtering and washing with 200 parts of water, 91 parts of azoformamide were obtained. This represents a yield of 93%.

*Example 2*

100 parts of hydrazoformamide were suspended in 300 parts of concentrated hydrochloric acid (36%) and 700 parts of water in which were dissolved 10 parts of sodium bromide. The pH of the medium was below 0. 65 parts of chlorine were passed into the suspension which was cooled to $30°$ C. On filtering and washing with 100 parts of water, 93 parts of azoformamide were obtained. This represents a yield of 95%.

*Example 3*

100 parts of hydrazoformamide were suspended in 600 parts of concentrated hydrochloric acid (36%) and 400 parts of water in which were dissolved 7 parts of bromine. The pH of the medium was below 0. 78 parts of chlorine were passed into the suspension below $20°$ C. On filtering and washing with 80 parts water, 95 parts azoformamide were obtained. This represents a yield of 97%.

Solely by way of comparison the above process was repeated exactly as described, but without including bromine or bromide in the reaction medium. Similarly the process was repeated exactly as described, but replacing the bromine successively by the same amount of ferric chloride, sodium iodide, antimony trichloride, stannous chloride, arsenious oxide, sulphur, sodium dichromate, chromium sulphate and nitric acid. The process was also repeated replacing the chlorine oxidising agent in the presence of bromine by the equivalent amount of sodium chlorate. For convenience the results obtained in all the comparative tests are given in the table below:

| Oxidising agent: | Percent yield of azoformamide |
|---|---|
| Chlorine alone | Less than 1. |
| Chlorine plus ferric chloride | Do. |
| Chlorine plus sodium oidide | Do. |
| Chlorine plus antimony trichloride | Do. |
| Chlorine plus stannous chloride | Do. |
| Chlorine plus arsenious oxide | Do. |
| Chlorine plus sulphur | Do. |
| Chlorine plus sodium dichromate | Do. |
| Chlorine plus chromium sulphate | Do. |
| Chlorine plus nitric acid | Do. |
| Sodium chlorate | Do. |

It will be seen from these comparative tests that extraordinarily high yields are obtained by the process of the present invention as compared with analogous oxidation processes.

*Example 4*

100 parts of hydrazoformamide were suspended in 250 parts of concentrated hydrochloric acid (30%) and 750 parts of water in which were dissolved 10 parts of cobaltic bromide. The pH of the medium was below 0. 66 parts of chlorine were passed into the suspension at 10–15° C. On filtering and washing with 200 parts of water 94.5 parts of azoformamide were obtained. This represents a yield of 96.5%.

*Example 5*

118 parts of hydrazoformamide were suspended in a mixture of 300 parts of concentrated hydrochloric acid (36%) and 700 parts of water in which were dissolved 10 parts of sodium bromide. The pH of the medium was below 0. The mixture was agitated in an enclosed vessel while 72 parts of chlorine were passed into it at a pressure of 20 pounds per square inch. On filtering and washing 113 parts of azoformamide were obtained. This represents a yield of 97%.

*Example 6*

100 parts of hydrazoformamide were suspended in a mixture of 800 parts of water, 200 parts of concentrated hydrochloric acid (36%) and 1 part of calcium bromide. The pH of the medium was below 0. 67 parts of chlorine were passed into the suspension which was cooled to 25° C. On filtering and washing with 200 parts of water 94 parts of azoformamide were obtained. This represents a yield of 96%.

*Example 7*

100 parts of hydrazoformamide were suspended in a mixture of 900 parts water, 100 parts concentrated hydrochloric acid (36%) and 20 parts of hydrobromic acid (48%). The pH of the medium was about 0. 66 parts of chlorine were passed into the suspension which was cooled to 20° C. On filtering and washing with 300 parts of water 93 parts of azoformamide were obtained. This represents a yield of 95%.

*Example 8*

100 parts of hydrazoformamide were suspended in 1000 parts of water in which were dissolved 8 parts of sodium bromide. The pH of the medium was 7. 69 parts of chlorine were passed into the suspension which was cooled to 10° C. On filtering and washing 91 parts of azoformamide were obtained. This represents a yield of 93%.

*Example 9*

100 parts of hydrazoformamide were suspended in a mixture containing 800 parts of water, 100 parts of sulphuric acid (pure) and 12 parts of potassium bromide. The pH of the medium was below 0. 66 parts of chlorine were passed into the suspension which was cooled to 30° C. On filtering and washing 89 parts of azoformamide were obtained. This represents a yield of 91%.

*Example 10*

100 parts of hydrazoformamide were suspended in a mixture containing 150 parts of concentrated hydrochloric acid (36%), 750 parts of water and 10 parts of cupric bromide. The pH of the medium was below 0. 68 parts of chlorine were passed into the suspension under a pressure of 25 p.s.i. at a temperature of 20–25° C. On filtering and washing 92 parts of azoformamide were obtained. This represents a yield of 94%.

*Example 11*

100 parts of hydrazoformamide were suspended in a mixture of 800 parts of water, 200 parts of concentrated hydrochloric acid (36%) and 10 parts of strontium bromide. The pH of the medium was below 0. 68 parts of cold liquid chlorine were added slowly to the vigorously stirred mixture which was held at 20–25° C. The resulting azoformamide was filtered off and washed, when 93 parts were obtained. This represents a yield of 95%.

*Example 12*

100 parts of hydrazoformamide were suspended in a mixture containing 300 parts of concentrated hydrochloric acid (36%), 700 parts of water and 8 parts of bromine. The pH of the medium was below 0. 440 parts of a solution containing 15% by weight of sodium hypochlorite were added to this suspension which was held at 15–20° C. On filtering and washing 88 parts of azoformamide were obtained. This represents a yield of 90%.

*Example 13*

100 parts of hydrazoformamide were suspended in a mixture containing 700 parts of water, 300 parts of hydrochloric acid (30%) and 12 parts of tetramethylammonium bromide. The pH of the medium was below 0. 67 parts of chlorine were passed into the suspension which was held at 20–25° C. On filtering and washing 92 parts of azoformamide were obtained. This represents a yield of 94%.

*Example 14*

100 parts of hydrazoformamide were suspended in a mixture containing 700 parts of water, 300 parts of concentrated hydrochloric acid (36%) and 15 parts of bromine monochloride. The pH of the medium was below 0. 64 parts of chlorine were passed into this suspension which was held at 20–25° C. On filtering and washing 93 parts of azoformamide were obtained. This represents a yield of 95%.

*Example 15*

13.2 parts of methylhydrazoformamide (CH$_3$.NH.CONH.NH.CO.NH$_2$)

were suspended in a mixture of 80 parts of water and 20 parts of concentrated hydrochloric acid (36%) containing 1 part of bromine. The pH of the medium was below 0. 7.7 parts of chlorine were passed slowly into the suspension which was maintained at 20–25° C. The product was filtered off, washed and dried to give 12.1 parts of monomethylazoformamide.

*Example 16*

20.8 parts of N-methyl-N-phenylhydrazoformamide were suspended in 75 parts of water to which were added 25 parts of concentrated phosphoric acid (85%) and 1.7 parts of concentrated hydrobromic acid (20%). The pH of the medium was below 0. 8.4 parts of chlorine were passed into the suspension which was maintained at 10–15° C. 17 parts of N-methyl-N-phenylazoformamide were formed.

*Example 17*

23.6 parts of N-ethyl-N-phenyl-N'-methylhydrazoformamide were suspended in 100 parts of hydrochloric acid solution containing 15 parts of hydrogen chloride. The pH of the medium was below 0. 1.1 parts of aluminium bromide were added and 8.2 parts of chlorine passed into the suspension which was maintained at 25–30° C. 22.7 parts of N-ethyl-N-phenyl-N'-methylazoformamide were obtained on filtering, washing and drying the product.

*Example 18*

32.6 parts of N-methyl-N-benzyl-N'-ethyl-N'-phenylhydrazoformamide were suspended in 60 parts of water. 40 parts of concentrated hydrochloric acid (36%) and 0.8 part of cadmium bromide were added and 8.3 parts of chlorine passed into the suspension which was kept at 10–15° C. 27.4 parts of N-methyl-N-benzyl-N'-ethyl-N'-phenylazoformamide were obtained.

*Example 19*

23.9 parts of NNN'N'-tetrabenzylhydrazoformamide were suspended in 50 parts of water to which were added 50 parts of concentrated hydrochloric acid (36%) and 1.0 part of lithium bromide. On passing 4.0 parts of chlorine at 20–25° C. 22 parts of NNN'N'-tetrabenzyl-azoformamide were obtained.

Example 20

21.1 parts of NNN'N'-tetraphenylhydrazoformamide were suspended in a mixture containing 75 parts of water, 25 parts of concentrated hydrochloric acid (36%) and one part of sodium bromide. On passing 4.1 parts of chlorine at 17–21° C. 18.2 parts of NNN'N'-tetraphenyl-azoformamide were obtained.

Example 21

45.2 parts of N-methyl-N-phenyl-N'-benzyl-N'-(7-ethylnaphthyl)hydrazoformamide were suspended in a mixture of 20 parts of water, 60 parts of sulpholane, 20 parts of hydrochloric acid (36%) and 1.1 parts of tetramethyl-ammonium bromide. On passing 8.7 parts of chlorine into this suspension which was kept at 22–26° C. 40.0 parts of N-methyl-N-phenyl-N'-benzyl-N'-(7-ethylnaphthyl)azoformamide were obtained.

Example 22

19.8 parts of N-phenyl-N-(2-methyl-4-isopropylphenyl)-N'-n-pentylhydrazoformamide were suspended in a mixture containing 10 parts of water, 50 parts of dioxan, 40 parts of concentrated hydrochloric acid (36%) and 1.1 parts of concentrated hydrobromic acid (25%). The suspension was held at 15–17° C. while 3.9 parts of chlorine were passed into it. 14.9 parts of N-phenyl-N-(2-methyl-4-isopropylphenyl)-N'-n - pentylazoformamide were obtained.

Example 23

3.98 parts of NN-dimethyl-N'-cyclo-hexyl-N'-n - dodecylhydrazoformamide were suspended in a mixture containing 60 parts of water, 40 parts of concentrated hydrochloric acid (36%) and 0.8 part of bromine. 8.1 parts of chlorine were passed into the suspension which was cooled to 0–5° C. and 34.4 parts of NN'-dimethyl-N'-cyclo-hexyl-N'-n-dodecylazoformamide were formed.

Example 24

22.4 parts of N-ethyl-N-secondary-butyl-N' - (2 - ethylphenyl)-N' - alpha-napthylmethylhydrazoformamide were suspended in 70 parts of water with 30 parts of concentrated hydrochloric acid (36%). 1 part of barium bromide was added followed by 4.2 parts of chlorine. The suspension was kept at 28–30° C. 21.0 parts of N-ethyl-N-secondary-butyl-N'-(2 - ethylphenyl) - N' - alpha-naphthylmethylazoformamide were obtained.

I claim:

1. A process for the oxidation of hydrazoamide of the formula

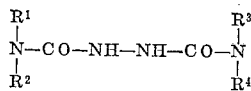

wherein each of $R^1$, $R^2$, $R^3$ and $R^4$ is a member selected from the group consisting of hydrogen, substituted and unsubstituted alkyl, substituted and unsubstituted cycloalkyl, substituted and unsubstituted aryl and substituted and unsubstituted aralkyl, the substituents of the substituted members being selected from the group consisting of chloro and nitro, to the corresponding azoamide which comprises contacting the hydrazoamide with chlorine in a non-alkaline medium containing from about 1 to about 20 percent by weight, based on the weight of the hydrazoamide, of a bromine compound selected from the group consisting of bromine and a bromide, the amount of reacting chlorine being maximally about the stoichiometric amount.

2. Process for the production of azoformamide which comprises oxidizing hydrazoformamide by bubbling chlorine through a medium having a pH in the range of from −2 to +7 containing a material selected from the group consisting of bromine and a bromide, the concentration of said material being in excess of 0.1% weight/volume and the amount of said material being 1–20% by weight of the hydrazoformamide the amount of chlorine reacting with the hydrazoformamide being at most the stoichiometric amount.

3. Process for the production of azoformamide which comprises oxidizing hydroazoformamide by bubbling chlorine through an aqueous suspension of hydrazoformamide, the aqueous suspension having a pH in the range from −2 to +7 and containing bromine at a concentration in excess of 0.1% weight/volume and in amount comprising 1–20% by weight of the hydrazoformamide starting material, the amount of reacting chlorine being maximally about the stoichiometric amount.

4. Process for the production of azoformamide which comprises oxidizing hydroazoformamide by bubbling chlorine through an aqueous suspension of a hydrazoformamide, the aqueous suspension having a pH in the range of from −2 to +7 and containing a bromide, the concentration of which is in excess of 0.1% weight/volume and the amount of the compound is from 1–20% by weight of the hydrazoformamide starting material, the amount of reacting chlorine being maximally about the stoichiometric amount.

5. Process for the production of azoformamide which comprises oxidizing hydrazoformamide by bubbling chlorine through a medium having a pH of from −2 to +7 and containing a catalytically effective amount of a material selected from the group consisting of bromine and a bromide, the amount of reacting chlorine being maximally about the stoichiometric amount.

6. Process for the production of azoformamide which comprises oxidizing hydrazoformamide by bubbling chlorine through a medium having a pH of from −2 to +7 and containing a catalytically effective amount of a material selected from the group consisting of bromine and a bromide, said oxidation being effected at a pressure in excess of atmospheric pressure, and the amount of reacting chlorine being maximally the stoichiometric amount.

7. Process for the production of azoformamide which comprises oxidizing hydrazoformamide by bubbling chlorine through an aqueous suspension of hydrazoformamide, the aqueous suspension having a pH of from −2 to +7 and containing a metal bromide, the concentration of which is in excess of 0.1% weight/volume and the amount of which is from 1 to 20% by weight of the hydrazoformamide, at a temperature of from −10 to +45° C., the amount of reacting chlorine being maximally the stoichiometrric amount.

8. Process for the production of azoformamide which comprises oxidizing hydrazoformamide by bubbling chlorine through an aqueous suspension of hydrazoformamide, the aqueous suspension having a pH of from −2 to +7 and containing hydrogen bromide, the concentration of which is in excess of 0.1% weight/volume and the amount of which is from 1–20% by weight of the hydrazoformamide, at a temperature of from −10 to +45° C., the amount of reacting chlorine being maximally the stoichiometric amount.

9. Process for the production of azoformamide which comprises oxidizing hydrazoformamide by bubbling chlorine through a medium having a pH of from −2 to +7 and containing a catalytically effective amount of a material selected from the group consisting of bromine and a bromide, the amount of reacting chlorine being maximally the stoichiometric amount.

10. Process for the production of azoformamide which comprises oxidizing hydrazoformamide by bubbling chlorine through an aqueous suspension of hydrazoformamide, said aqueous suspension having a pH of from −2 to +7 and containing a catalytically effective amount of a material selected from the group consisting of bromine and a bromide, at a temperature of from −10° to +45°

C., and the amount of reacting chlorine being maximally the stoichiometric amount.

11. Process for the production of azoformamide which comprises oxidizing hydrazoformamide by bubbling chlorine through a medium having a pH of from −2 to +7 and containing a catalytically effective amount of a material selected from the group consisting of bromine and a bromide, the amount of chlorine reacting with the hydrazoformamide being at most the stoichiometric amount.

References Cited by the Examiner

UNITED STATES PATENTS

| | | | |
|---|---|---|---|
| 2,444,924 | 7/48 | Farkas et al. | 260—596 X |
| 2,469,358 | 5/49 | Alderson et al. | 260—192 |
| 2,988,545 | 6/61 | Hill | 260—192 |

CHARLES B. PARKER, *Primary Examiner.*

LEON ZITVER, *Examiner.*